Feb. 26, 1935. J. E. TONE 1,992,556
PROCESS OF PACKING COFFEE
Filed Nov. 10, 1931
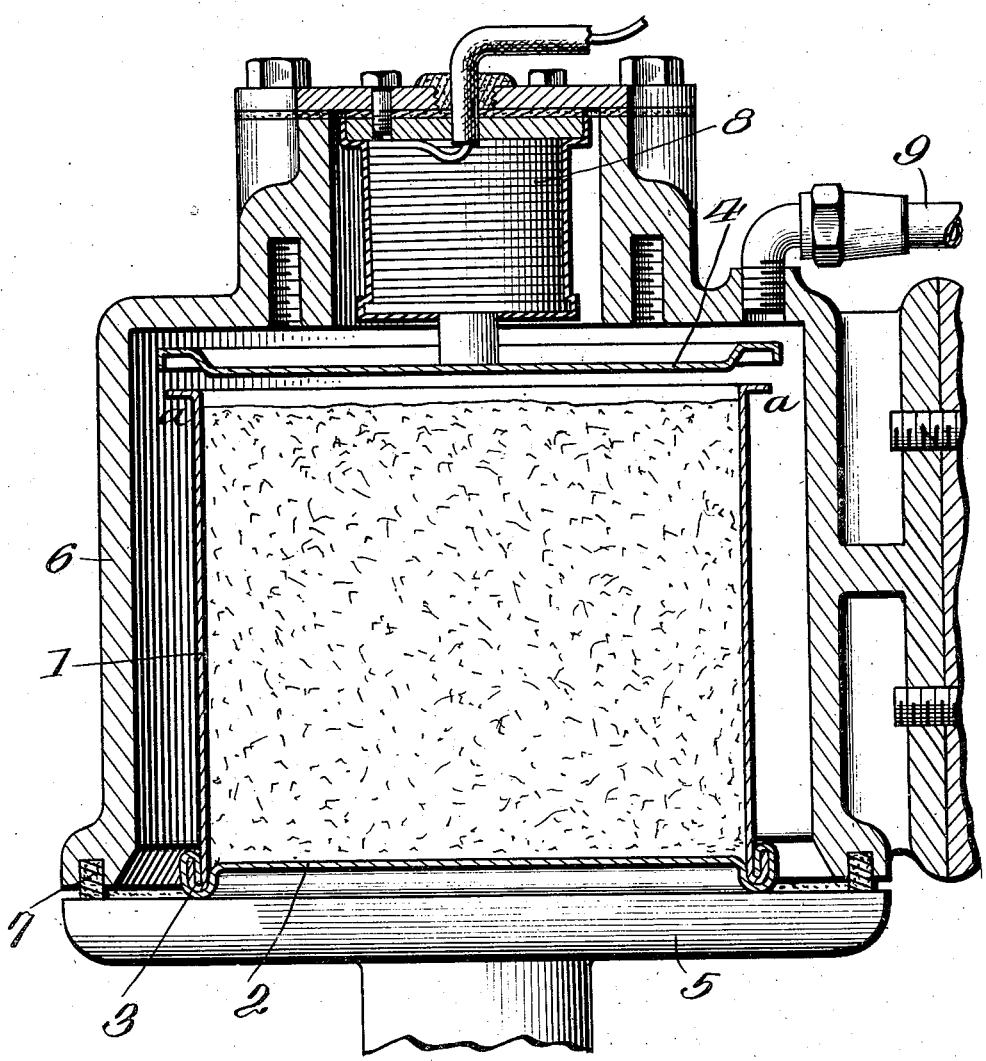
Inventor
Jay E. Tone
By Sturtevant, Mason & Porter
Attorneys Patented Feb. 26, 1935

1,992,556

UNITED STATES PATENT OFFICE 1,992,556

PROCESS OF PACKING COFFEE

Jay E. Tone, Des Moines, Iowa

Application November 10, 1931, Serial No. 574,209

2 Claims. (Cl. 99—8)

The invention relates to new and useful improvements in a process of packing roasted coffee and more particularly to a process whereby the roasted coffee is packed in the containers in which it is to be marketed.

An object of the invention is to provide a process whereby the roasted coffee, after it is ground, may be quickly sealed in containers in which the air has been replaced by an inert gas so that the roasted coffee is maintained in substantially the same condition as freshly ground coffee until the container is opened.

In the drawing there is shown diagrammatically a portion of an apparatus which may be used in the carrying out of the invention.

It is well known that roasted coffee when it is ground immediately evolves a gas which includes carbon dioxide and carbon monoxide. This gas comes off slowly from the roasted coffee and it is several weeks before it all leaves the coffee cells.

It is also well known that air has a deleterious effect on ground roasted coffee which quickly impairs the quality of the roasted coffee. If the coffee, after it is ground, is to be maintained for any time in its fresh ground condition, it must be maintained free from contact with the air and the oxygen content thereof and it must be maintained so as to hold within the roasted coffee cells the gases contained therein.

In the carrying out of the present invention, the coffee, after it is roasted, is immediately ground and is then immediately packed so that it is placed in the containers as soon as possible after it is roasted. The coffee gas begins to escape from the coffee bean as soon as it is roasted and passes off very much more rapidly after the coffee is ground. The briefer the period of time in which the coffee gas is permitted to escape, the better will be the condition of the roasted coffee when packed. Then again, when the coffee is ground immediately after it is roasted, and packed immediately after it is ground, it is subjected to the deleterious effect of the oxygen of the air for a very short period of time. When it is placed in the containers, the air is replaced by an inert gas which accomplishes the double function of retaining the coffee gas within the cells of the coffee and preventing the contact of the oxygen of the air with the roasted coffee.

For the purpose of making more clear the invention, brief reference will be made to the drawing which illustrates one form of apparatus for replacing the air in the container with an inert gas. The container is indicated at 1. It is preferably of cylindrical form and the end 2 is secured thereto by a double seam 3. The container is filled with roasted coffee to the line indicated at a—a. The cover or closing end 4 is loosely applied to the container after the freshly ground coffee has been placed therein. The container is then placed on a support 5 and is lifted into a bell 6, said support contacting with an elastic pad 7 and hermetically closing the chamber. A magnetic coil 8 located within the chamber lifts the cover or closing end 4 from the container. There is a pipe 9 which leads to the chamber and the air is withdrawn from the chamber and from the container by this pipe. Thus it is that a vacuum is created in the chamber and on the container. The chamber is preferably made slightly larger than the container but of the same general dimensions so that the air may be withdrawn from the chamber and the container very quickly.

The vacuum is replaced by inert gas which is passed into the chamber by the pipe 9. The inert gas is delivered to the chamber under a pressure slightly above atmospheric pressure. It is desired to operate with the gas under comparatively low pressure so that the amount of gas used in replacing the air will be of minimum amount.

It is also desired to draw the vacuum quickly and replace the same quickly with inert gas so that the roasted coffee will not be subjected to the vacuum pull on the container for any great length of time which would cause the gas within the cells of the coffee to evolve and pass off. In other words, it is desired during this replacing of the air within the container to remove just as little as possible of the gas within the cells of the roasted coffee.

The chamber is then placed under a vacuum through the pipe 9 a second time and this is quickly replaced again by admitting an inert gas from the pipe line into the chamber. This cycle of operations may be continued until practically all of the air has been drawn out of the container and replaced by the inert gas.

As an inert gas, carbon dioxide may be used, nitrogen may be used, and a portion of carbon monoxide used with the carbon dioxide, and the three may be used together or some other inert gas may be used in place thereof. It is preferred, however, to use a combination of carbon dioxide and carbon monoxide with nitrogen, as this most closely approximates the gas which is evolved from the roasted coffee. Therefore, the gas which contacts with the roasted coffee has the same characteristics as the gas which evolves from the coffee. Furthermore, the gases specified are heavier than air, and this greatly facilitates the sealing of the container after it is removed from the chamber at atmospheric pressure, without any appreciable amount of air with oxygen therein entering the container.

After the air has been displaced by the inert gas, then the cover or closing end is dropped onto the container and the chamber is open to the atmosphere. The container is taken out and the cover or closing end secured to the body portion by double seaming.

Inasmuch as the air is replaced by an inert gas so that the roasted coffee is maintained out of contact with the air and the oxygen content thereof, the oxidation of the coffee oils is prevented. The evolving gas passing out of the cells comes off very quickly immediately upon the grinding of the coffee and the breaking of the roasted coffee beans. This evolving gas will keep the air, to a large extent, away from the coffee so that comparatively little deterioration takes place through the oxidation of the oils within the roasted coffee, before the coffee has been placed in the container and sealed by the inert gas. Furthermore, when the roasted coffee is immediately placed in the container a very small proportion of the gas within the coffee cells has evolved and as soon as it is sealed in the container in the presence of the inert gas, the evolving of gas will continue until the pressure in the container balances the pressure in the coffee cells and prevents further evolving of gas from the roasted coffee. When the container is opened, the coffee is practically in the same condition of freshly ground coffee, that is, the oils are free from rancidity and the coffee gas is housed within the cells of the coffee ready to evolve and pass off from the coffee in the same way that it does from the freshly ground coffee.

Coffee has been packed commercially in containers in vacuum for the purpose of maintaining the coffee free from contact with the air. When coffee is packed in vacuum the gas within the cells of the coffee evolves very rapidly and replaces the vacuum, often creating a pressure within the container. When a vacuum packed container is opened, much of the gas within the cells of the coffee has passed off and the rapid evolving of the gas from the coffee which occurs with freshly ground coffee is not present and therefore the coffee will very quickly deteriorate as to quality and aroma.

By my process, however, where the gas within the roasted coffee is maintained within the cells until the container is opened, all of the characteristics of freshly ground coffee exist when the container is opened and the coffee will maintain its freshness and its aroma as though it were freshly ground.

The apparatus referred to in detail is solely for the purpose of illustrating the steps of the process which may be carried out in many ways.

The container may have the end secured thereto before it is placed in the vacuum chamber, the end then perforated and the container placed under vacuum and the vacuum replaced by inert gas through the opening formed in the end and the opening closed for sealing the container. Another way of replacing the air within the container consists in providing both the top end and the bottom end with an opening and without forming any vacuum within the chamber forcing the inert gas in through one of the openings and out through the other. Still another way consists in inserting a tube through an opening to a point adjacent the bottom of the container and forcing a heavy inert gas into the container and the food product therein for forcing the air out. The invention is directed particularly to the replacing of the air with an inert gas and the packing of the coffee immediately after it is ground before any appreciable amount of gas within the coffee cells has evolved and passed off from the coffee.

Having thus described the invention, what I claim as new and desire to secure by Letters-Patent, is—

1. The process of packing coffee, consisting in placing freshly ground roasted coffee in a container in which it is to be marketed, and immediately subjecting the container to vacuum applied quickly for drawing the air from the container, and applied in proper degree, and for a period so short that a minimum amount of gas is drawn from the coffee cells, and immediately replacing the vacuum with an inert gas, promptly repeating the cycle of vacuum and gas filling and sealing the container, whereby the packed coffee is retained in its roasted state with a minimum loss of its naturally contained volatiles.

2. The process of packing coffee, consisting in placing freshly ground roasted coffee in a container in which it is to be marketed, and immediately subjecting the container to vacuum applied quickly for drawing the air from the container, and applied in proper degree, and for a period so short that a minimum amount of gas is drawn from the coffee cells, and immediately replacing the vacuum with an inert gas and promptly sealing the container, whereby the packed coffee is retained in its roasted state with a minimum loss of its naturally contained volatiles.

JAY E. TONE.